I. L. LANDIS.

Buckle for Harness.

No. 9,088. Reissued Feb. 17, 1880.

Witnesses:

Franck L. Durand

H. Aubrey Toulmin

Inventor:

Israel L. Landis

Alexander Mason

N. PETERS, PHOTO-LITHOGRAPHER, WASHINGTON, D. C.

UNITED STATES PATENT OFFICE.

ISRAEL L. LANDIS, OF LANCASTER, PENNSYLVANIA.

BUCKLE FOR HARNESS.

SPECIFICATION forming part of Reissued Letters Patent No. 9,088, dated February 17, 1880.

Original No. 165,936, dated July 27, 1875. Application for Reissue filed December 31, 1879.

*To all whom it may concern:*

Be it known that I, ISRAEL L. LANDIS, of Lancaster, in the county of Lancaster and State of Pennsylvania, have invented certain new and useful Improvements in Buckles; and I do hereby declare that the following is a full, clear, and exact description thereof, reference being had to the accompanying drawings, and to the letters of reference marked thereon, which form a part of this specification.

My invention relates to harness-buckles; and it consists in a solid frame having a crank-shaft at or near the center, to which the tongue is pivoted, and also in combining a lever with such crank or eccentric, forming a simple and efficient device for withdrawing the tongue, as will be hereinafter more fully set forth.

In order to enable others skilled in the art to which my invention appertains to make and use the same, I will now proceed to describe its construction and operation, referring to the annexed drawings, in which—

Figure 1:
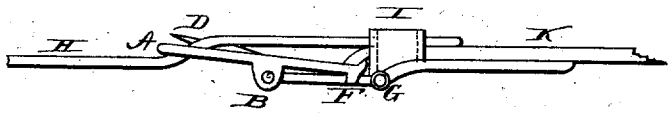
Figure 2:
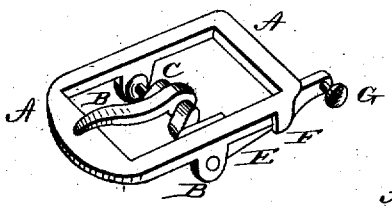
Figure 3:
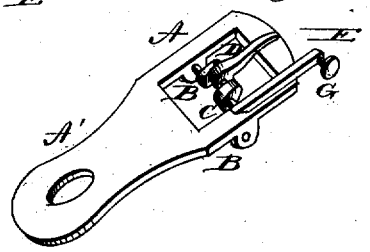
Figure 4:
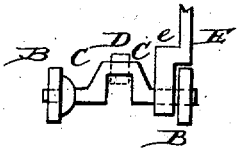

Figure 1 shows a side view of the buckle and its application to the leather straps H K and keeper I. Fig. 2 shows the buckle detached with lever-arm under the frame. Fig. 3 is a modification showing the lever-arm on top of the frame. Fig. 4 shows the combined crank-shaft and lever with relation to the lugs or bearings on each side under the frame.

A represents the buckle-frame, which is made solid—that is to say, the two parallel side arms of the buckle are connected at both ends. This frame is provided with a lug, B, on each side on its under surface, and these lugs are perforated to form bearings for an eccentric or crank shaft, C, on which the tongue D is pivoted. At one end the crank-shaft C is provided with a lever-arm, E. This latter is provided with a button, G, either for being operated by hand direct or by the intervention of a cord leading to the vehicle, accessible at a convenient point.

These buckles can be made right or left handed, or so as to bring the lever-arm to rest on the upper surface or against the under side of the frame.

To prevent accidental unshifting or withdrawal of the tongue from relaxation of the stiff leather straps, a catch, F, Fig. 2, is shown.

For attaching to vehicles the frame of the buckle may be extended, as shown by A′, Fig. 3, and provided with an eye to connect it to a single-tree or the like, constituting a metallic attachment or extension of the buckle.

The operation of the buckle is in either case the same, whether the lever is raised by a cord or strap connection or by hand direct. It withdraws the tongue in a straight line out of its connection by being hinged to the crank-shaft in the manner shown, giving the driver easy and complete control by a simple pull on the lever connected with it.

I am aware that an open buckle has been made with a crank-shaft to which the tongue is pivoted.

Having thus fully described my invention, what I claim as new, and desire to secure by Letters Patent, is—

1. In a buckle, the solid frame A, provided with the crank-shaft C, having the tongue D pivoted thereon, substantially as and for the purposes herein set forth.

2. In a buckle, the combination of the solid frame A, the crank-shaft C, the tongue D, pivoted on the crank-shaft, and the lever-arm E, secured to said shaft, substantially as and for the purposes herein set forth.

3. In a buckle, the solid frame A, provided with the catch F, the crank-shaft C, with tongue D pivoted thereon, and the lever-arm E, secured to the shaft, all constructed and combined substantially as and for the purposes herein set forth.

In testimony that I claim the foregoing I have hereunto set my hand this 22d day of December, 1879.

ISRAEL L. LANDIS.

Witnesses:

H. AUBREY TOULMIN,

SAMUEL A. GROFF.